United States Patent [19]
Fujii et al.

[11] Patent Number: 5,550,538
[45] Date of Patent: Aug. 27, 1996

[54] NAVIGATION SYSTEM

[75] Inventors: Takao Fujii, Cupertino, Calif.;
Tatsuhiko Abe, Saitama, Japan

[73] Assignee: Zexel Corporation, Tokyo, Japan

[21] Appl. No.: 331,677

[22] Filed: Oct. 31, 1994

Related U.S. Application Data

[63] Continuation of Ser. No. 91,761, Jul. 14, 1993, abandoned.

[51] Int. Cl.⁶ .................................................. G08G 1/123
[52] U.S. Cl. .......................... 340/995; 340/990; 364/449
[58] Field of Search ............................... 340/990, 995,
340/905, 988, 286.14; 73/178 R; 364/444, 449

[56] References Cited

U.S. PATENT DOCUMENTS

| | | | |
|---|---|---|---|
| 4,992,947 | 2/1991 | Nimura et al. | 340/995 |
| 5,043,902 | 8/1991 | Yokoyama et al. | 340/995 |
| 5,220,507 | 6/1993 | Kirson | 364/444 |
| 5,243,528 | 9/1993 | Lefebvre | 364/444 |
| 5,262,775 | 11/1993 | Tamai et al. | 340/995 |
| 5,291,412 | 3/1994 | Tamai et al. | 340/995 |
| 5,291,413 | 3/1994 | Tamai et al. | 340/995 |

*Primary Examiner*—Brent A. Swarthout
*Attorney, Agent, or Firm*—Christopher R. Pastel; Alfred W. Froebrich; Thomas R. Morrison

[57] ABSTRACT

A navigation system mounted on a vehicle computes in advance an optimal route from a starting point to a destination. When the vehicle travels off the optimal route, the navigation system detects an off-route deviation. When an off-route deviation is detected, the system computes a restoration route from the vehicle's present position to a selected point on the optimal route and rapidly displays navigational information to guide the vehicle thereto. Thus there is no need for the system to compute a new optimal route from the present position to the destination, and there is no delay in supplying the driver with navigational information.

11 Claims, 5 Drawing Sheets

5,550,538

NAVIGATION SYSTEM

This is a continuation of application Ser. No. 08/091,761 filed Jul. 14, 1993, now abandoned.

BACKGROUND OF THE INVENTION

This invention relates to a navigation system mounted on a vehicle.

Navigation systems have been proposed that compute an optimal route from a starting point to a destination and guide a vehicle along the route.

The vehicle may get off the optimal route through the driver's carelessness (hereinafter "off-route deviation"). Japanese Patent Publication No. 2-18488 and Japanese Laid-Open Patent Application No. 2-141899 disclose systems in which, when the vehicle gets off the original optimal route, a new optimal route is recomputed from the vehicle's present position to the destination. The vehicle is then guided along the new optimal route.

With such a navigation system, however, if the distance is long from the vehicle's present position to its destination, recomputing the new optimal route takes considerable time, so the navigational guidance information cannot be immediately presented to the driver. This delay causes the driver to feel uneasy. In the worst case, during the prolonged recomputation the vehicle goes straight through an intersection where it should have turned. As a result, the partial recomputation becomes useless, and the vehicle cannot be guided along the new optimal route.

SUMMARY OF THE INVENTION

An object of the present invention is to provide a navigation system in which, when a vehicle gets off an optimal route, a new optimal route along which the vehicle should travel from its present position can be computed so rapidly that the navigational guidance is not interrupted.

Briefly stated, the present invention provides a navigation system mounted on a vehicle that computes in advance an optimal route from a starting point to a destination. When the vehicle travels off the optimal route, the navigation system detects an off-route deviation. When an off-route deviation is detected, the system computes a restoration route from the vehicle's present position to a selected point on the optimal route and rapidly displays navigational information to guide the vehicle thereto. Thus there is no need for the system to compute a new optimal route from the present position to the destination, and there is no delay in supplying the driver with navigational information.

According to an embodiment of the invention, a navigation system comprises: means for detecting a present position of a vehicle; first computing means for computing an optimal route for the vehicle from a starting point to a destination; means for selecting a first plurality of marked points on the optimal route; off-route detection means for detecting a deviation of the vehicle from the optimal route; and second computing means for computing an optimal restoration route from the present position to a restoration point on the optimal route when the off-route detection means detects the deviation of the vehicle from the optimal route, the restoration point being a one of the first plurality of marked points.

According to a feature of the invention, a navigation system comprises: means for detecting a present position of a vehicle; first computing means for computing an optimal route for the vehicle from a starting point to a destination; means for selecting one restoration point on a section of the optimal route that extends between the present position of the vehicle and the destination; the means for selecting being also effective for renewing the restoration point as the present position changes over time; off-route detection means for detecting a deviation of the vehicle from the optimal route; and means for computing an optimal restoration route from the present position to the restoration point when the off-route detection means detects the deviation of the vehicle from the optimal route.

According to another feature of the invention, a navigation system comprises: a microcomputer; a map information storage medium storing map information; an axle sensor effective for determining distance traveled by a vehicle; a directional sensor effective for determining direction of travel of the vehicle; the microcomputer cooperating with the axle sensor and the directional sensor to determine a present position of the vehicle; an input device effective for entering a starting point and a destination of the vehicle into the microcomputer; the microcomputer cooperating with the map information storage medium for computing an optimal route for the vehicle from the starting point to the destination; the microcomputer being effective for selecting a plurality of marked points on the optimal route; the microcomputer cooperating with the map information storage medium, the axle sensor, and the directional sensor for detecting a deviation of the vehicle from the optimal route; the microcomputer being further effective for computing an optimal restoration route from the present position to a restoration point on the optimal route when the deviation of the vehicle from the optimal route is detected; and the restoration point being a one of the plurality of marked points.

The above, and other objects, features, and advantages of the present invention will become apparent from the following description read in conjunction with the accompanying drawings, in which like reference numerals designate the same elements.

DESCRIPTION OF THE PREFERRED EMBODIMENTS

Figure 1:
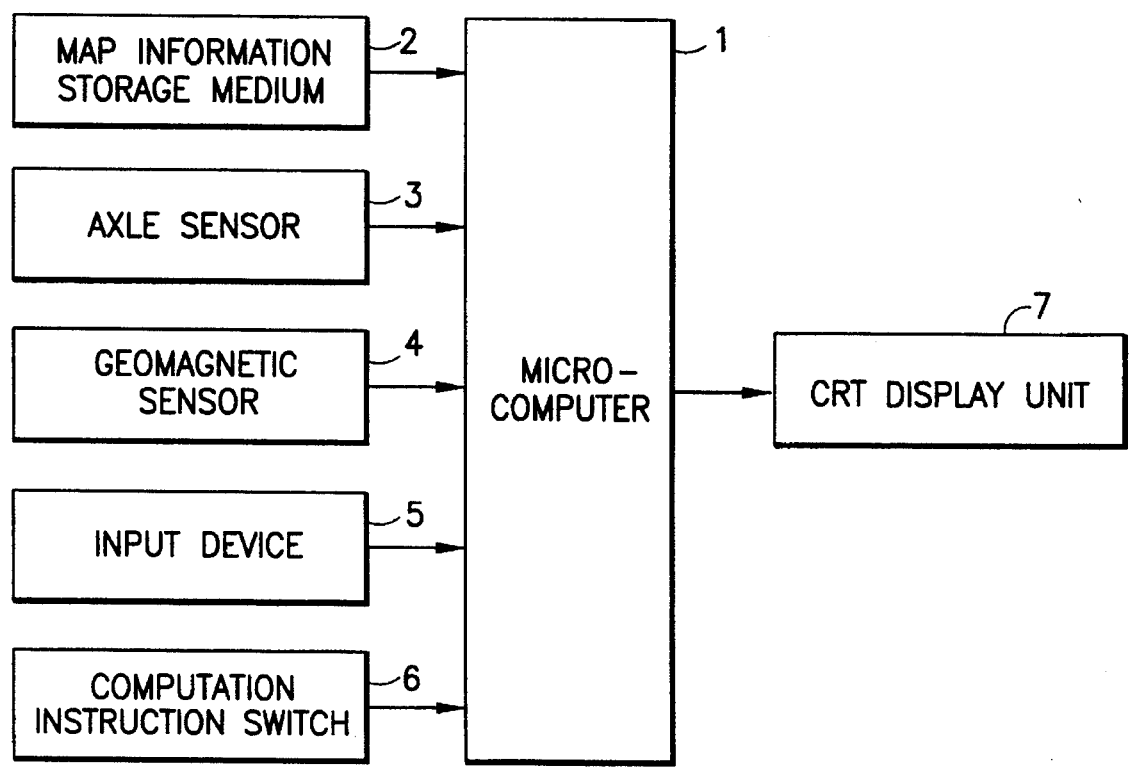
FIG. 1 is a block diagram showing the general construction of a navigation system according to the present invention.

Referring to FIG. 1, a navigation system mounted on a vehicle comprises a microcomputer 1, a map information storage medium 2 (e.g., a CD-ROM or an IC card) containing map information (including a road network with intersections), an axle sensor 3 for supplying microcomputer 1 with pulses whose number corresponds to the number of revolutions of an axle of the vehicle, a geomagnetic sensor 4 for supplying microcomputer 1 with a signal that represents the direction of advance of the vehicle, an input device 5 for entering a starting point and a destination into microcomputer 1, a computation instruction switch 6 for supplying microcomputer 1 with a signal to compute a restoration route when an off-route deviation occurs (as described below), and a CRT display unit 7 for displaying visually the output of microcomputer 1. The computation instruction switch 6 is in the form of a touch key on a screen of CRT display unit 7.

Microcomputer 1 computes a distance of travel of the vehicle by integrating the signal from axle sensor 3. Also computed is a bearing (azimuth) of the vehicle from the signal from geomagnetic sensor 4. Then microcomputer 1 computes the present position of the vehicle from the starting point, the integrated travel distance, and the bearing.

The present position of the vehicle may also be computed by a GPSS (Global Positioning System with Satellite) method from three or four artificial satellites.

Microcomputer 1 also computes an optimal route from the starting point to the destination in accordance with the information from map information storage medium 2 and the starting point and destination supplied from input device 5. The optimal route is computed so that either the distance or the time to travel (from the starting point to the destination) is minimized.

Microcomputer 1 computes navigational information from the present position and the optional route and causes this information to be displayed on CRT display unit 7. Navigational information means the information necessary to guide the vehicle along the optimal route. In this embodiment the name of the road the vehicle is to enter at the next turning point, the distance from the present position to the next turning point, and an arrow showing the direction the vehicle should travel are sequentially displayed.

Navigational information may be given aurally instead of by visual display, or it may be given both visually and aurally.

Microcomputer 1 determines from the present position of the vehicle and the optimal route whether or not the vehicle has deviated from the optimal route.

When the vehicle is off the route, microcomputer 1 causes CRT display unit 7 to display "The vehicle has been off the route. Do you want the computation of a restoration route?". When computation instruction switch 6 (the touch key on the screen of CRT display unit 7) is turned on, microcomputer 1 computes a restoration route for guiding the vehicle from its present position to the original optimal route. Microcomputer 1 also computes navigational information to guide the vehicle along the restoration route from its present position, and this navigational information is displayed on CRT display unit 7 as described above. The vehicle is thus guided to the original optimal route along the restoration route. After the vehicle is restored to the original optimal route, navigational information is displayed to guide the vehicle along the optimal route in the same manner as before the vehicle deviated from the route.

Figure 2:
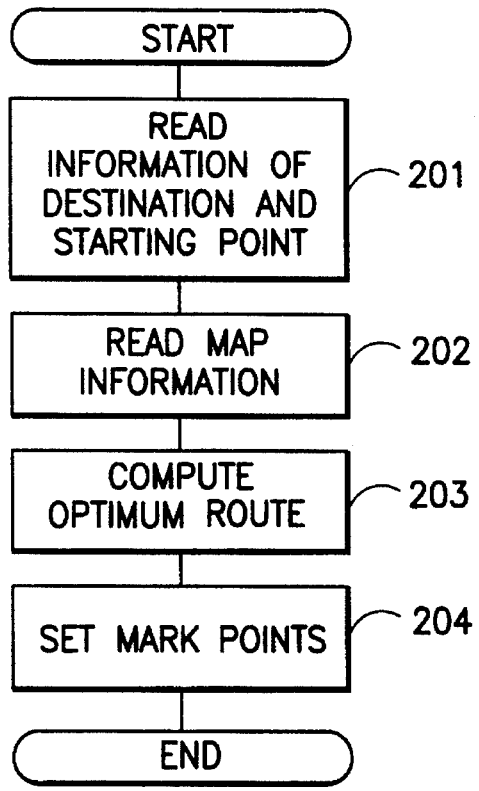
FIG. 2 is a flow chart of a routine for computing an optimal route and the determination of mark points, which routine is executed by the microcomputer of FIG. 1.

Referring to FIG. 2, the routine for computing the optimal route to the destination is started when an ignition key switch of the vehicle or a start switch of the navigation system is turned on. In Step 201, the starting point and the destination are read in. In Step 202 the map information is read in, and in Step 203 the optimal route from the starting point to the destination is computed from the map information.

In Step 204 each intersection point on the optimal route may be marked. If all the intersections are not marked, a plurality of selected intersections may be marked and others skipped. This plurality may be a predetermined number of intersections chosen between any two selected intersections. Instead of marking intersections, arbitrary points located at equal intervals along the optimal route may be marked.

Figure 4:
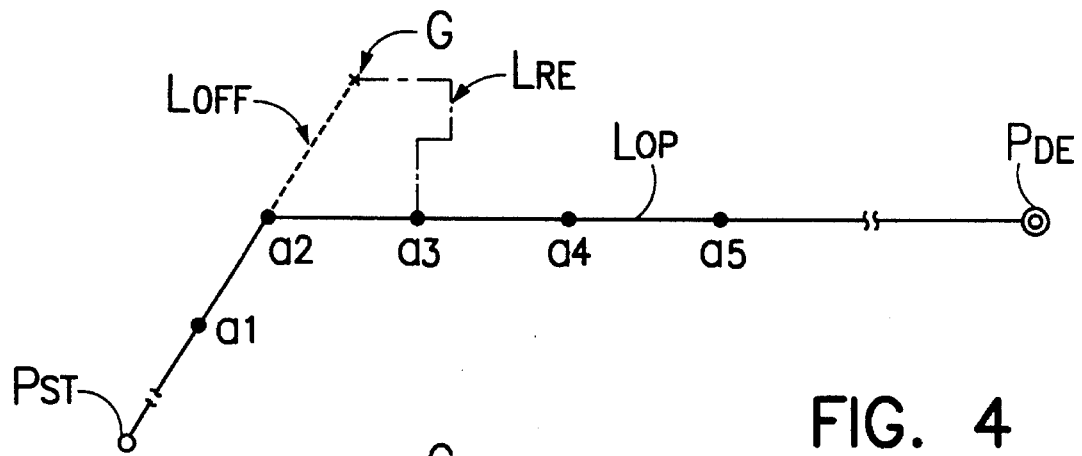
FIG. 4 is an illustration of a method of determining a restoration (or return) route in the event of an off-route deviation.

Referring to FIG. 4, the initially-computed optimal route from the starting point $P_{ST}$ to the destination $P_{DE}$ is indicated by a solid line $l_{OP}$, and a portion $a_1$ to $a_5$ of the set of marked points is indicated on the optimal route $l_{OP}$. A broken line $l_{OFF}$ indicates a route along which the vehicle travels when deviating from the optimal route $l_{OP}$, as later described.

Figure 3:
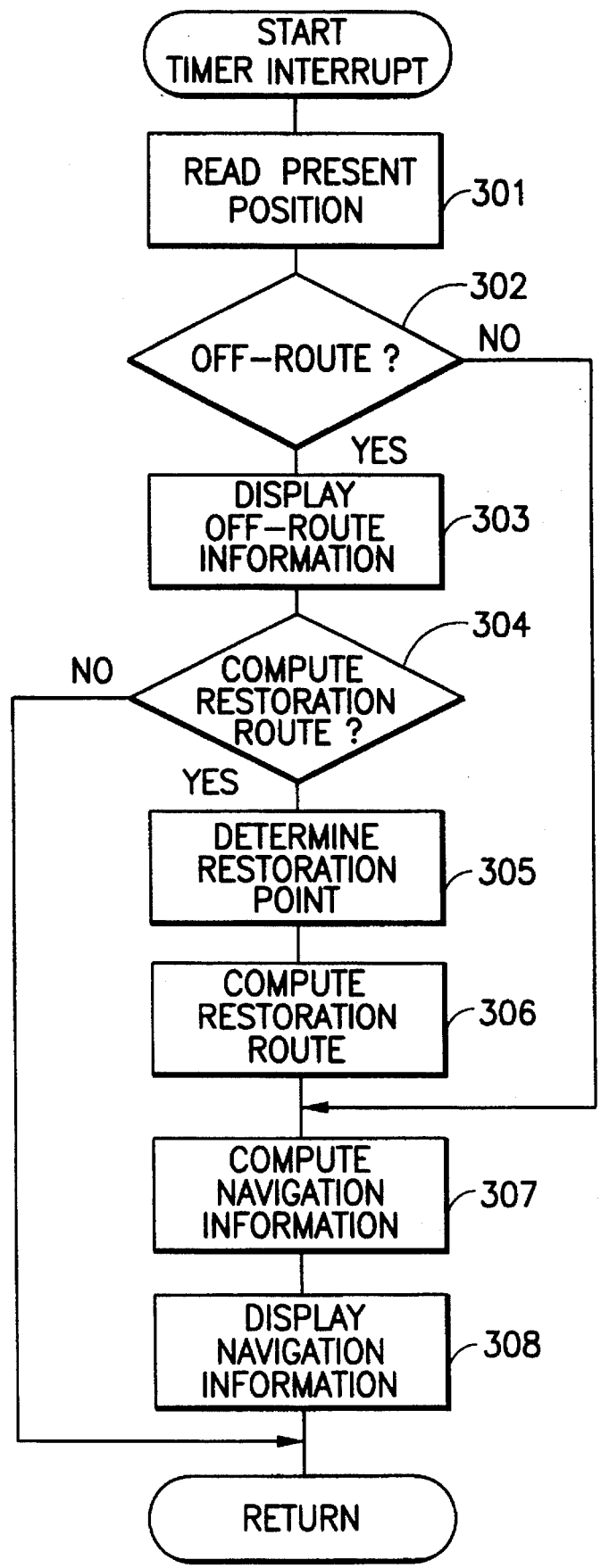
FIG. 3 is a flow chart that shows how the microcomputer of FIG. 1 controls the display of navigational guidance.

Referring to FIG. 3, microcomputer 1 executes a timer interrupt routine at predetermined time intervals. In Step 301, the present position is read in, and in Step 302 the program determines whether or not an off-route deviation has occurred, that is, whether the present position deviates from the initially-computed optimal route $l_{OP}$.

If the program determines that an off-route deviation has not occurred, the program proceeds to Step 307, where navigational information is computed from the present position and the optimal route. In Step 308 this navigational information is displayed on CRT display unit 7. In contrast, if the program determines that an off-route deviation has occurred, the characters "Off-route has occurred. Do you want the computation of a restoration route?" are displayed on CRT display unit 7 (Step 303). In Step 304, the program determines whether computation instruction switch 6 is ON or OFF. If computation instruction switch 6 is OFF even after a predetermined time period elapses, this routine ends without computing and displaying navigational information. In contrast, if the program determines that computation instruction switch 6 is ON within the predetermined time period, the program proceeds to Step 305. In step 305, from preset mark points $a_1$, $a_2$, $a_3$, $a_4$, and $a_5$, mark point $a_3$, which is nearest (in terms of straight distance) to a present position G, is selected, as shown in FIG. 4, as a restoration point. In Step 306, an optimal restoration route $l_{RE}$ from present position G (serving here as a starting point) to the restoration point $a_3$ is computed. In Step 307 navigational information is computed from optimal restoration route $l_{RE}$ and present position G. In Step 308 this navigational information is displayed on CRT display unit 7, and this routine ends. If the present position of the vehicle is on restoration route $l_{RE}$, it is determined in Step 302 that an off-route deviation has not been encountered.

Thus, in the event of an off-route deviation, restoration route $l_{RE}$ for returning the vehicle to a marked point on the optimal route is short, and computing this restoration route by microcomputer 1 is much faster than computing a totally new optimal route. In other words, computation of the route from the restoration point to the destination can be omitted. As a result, navigational information on this restoration route is rapidly offered to the driver.

Figure 5:
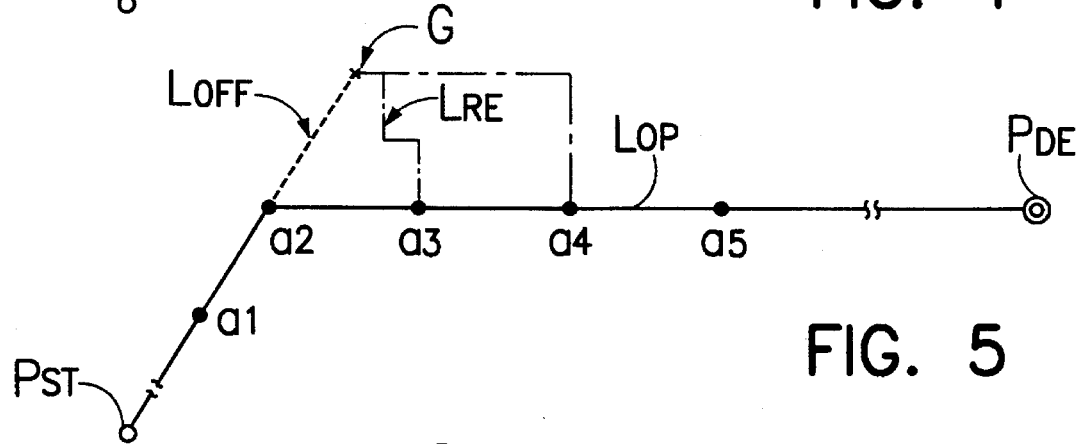
FIG. 5 is an illustration of another method of determining a restoration route in the event of an off-route deviation.

Referring to FIG. 5, a modified method of determining a restoration route in the event of an off-route deviation, a plurality of (for example, three) marked points $a_2$, $a_3$, and $a_4$, which are nearer (in terms of straight distance) to present position G than the other mark points, are selected. A plurality of restoration routes, each extending from present position G to a respective one of selected mark points $a_2$, $a_3$, and $a_4$, is computed, and the optimal one among these restoration routes is determined. Computing the restoration routes from present position G to respective mark points $a_2$, $a_3$, and $a_4$ may be simultaneous. In this case, if the method used to simultaneously compute the restoration routes finishes computing the optimal restoration route first (for example, the known DIJKSTRA METHOD), computing the other restoration routes can be canceled halfway.

Figure 6:
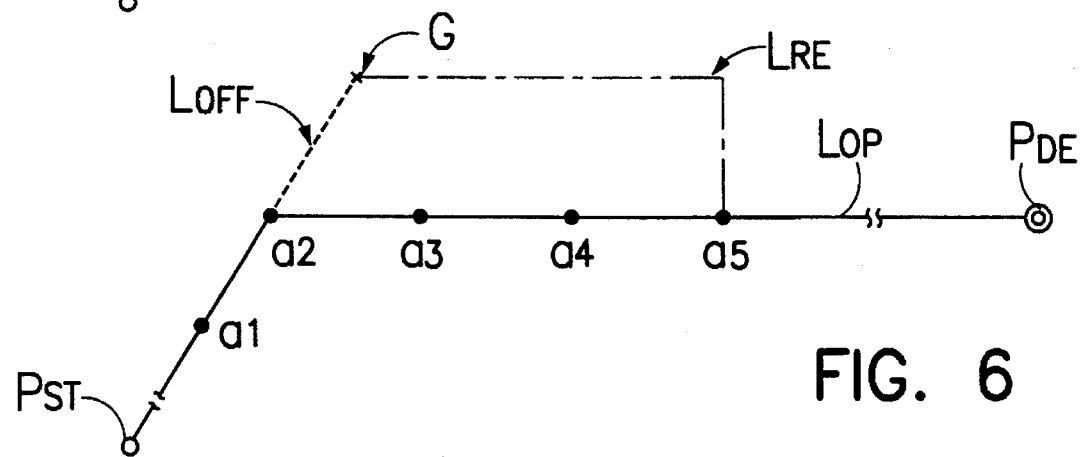
FIG. 6 is an illustration of a further method of determining a restoration route in the event of an off-route deviation.

Referring to FIG. 6, in another modified method of determining a restoration route, another marked point (for example, marked point $a_5$), spaced from marked point $a_3$, the nearest to present position G, is chosen as a restoration point. A predetermined number of marked points is disposed between this restoration point and mark point $a_3$. This embodiment responds to the situation in which the driver comes upon an unexpected traffic obstacle and intentionally deviates from the optimal route. Alternatively, that marked point (for example, marked point $a_5$) spaced from point $a_2$ where the vehicle deviates from the optimal route may be chosen as a restoration point, a predetermined number of marked points being disposed between this restoration point and point $a_2$.

Figure 7:
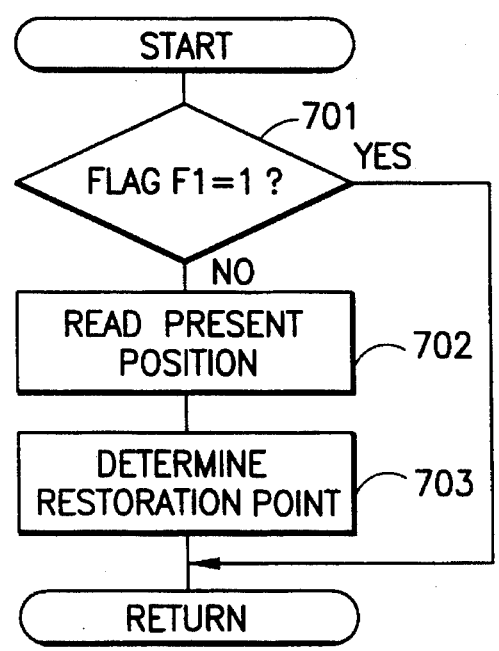
FIG. 7 is a flow chart of a modified routine executed by the microcomputer.
Figure 9:
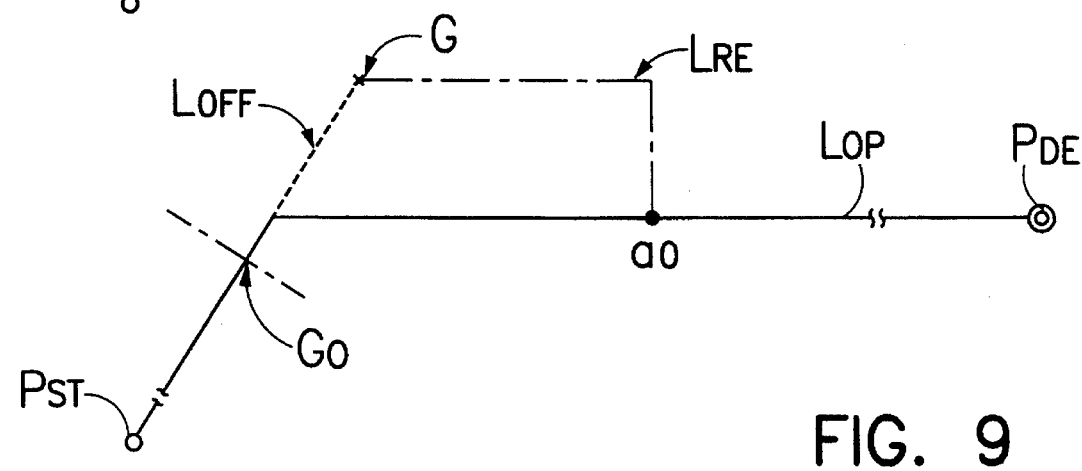
FIG. 9 is an illustration of a method of determining a restoration route in the routines of FIGS. 7 and 8.

Referring again to FIG. 2, in a further embodiment, Steps 201, 202, and 203 are executed to determine an optimal route, but the routine is finished before marked points are selected (Step 204). Referring to FIG. 7, in this embodiment microcomputer 1 executes a timer interrupt routine. In Step 701, the program determines whether or not a flag F1 is set. Flag F1 indicates that there is an off-route deviation. In the first routine, flag F1 is not set, so the program proceeds to Step 702 where the present position is read in. In Step 703, as shown in FIG. 9, a restoration point $a_0$ is determined from present position $G_0$ and optimal route $l_{OP}$ according to a predetermined rule. For example, restoration point $a_0$ is determined to be located at a central point between present position $G_0$ and destination $P_{DE}$. Restoration point $a_0$ is renewed each time the timer interrupt routine is executed.

Figure 8:
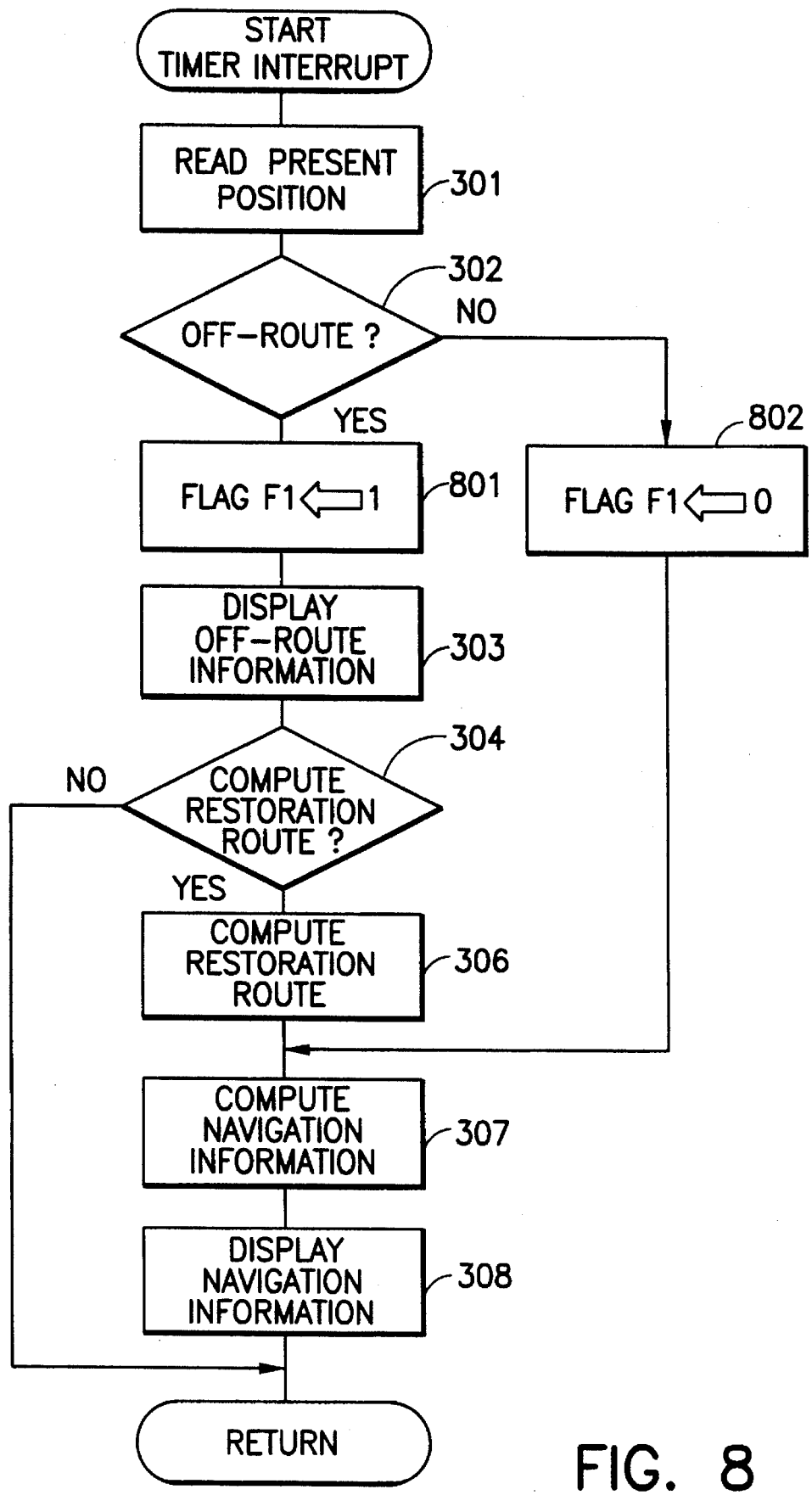
FIG. 8 is a flow chart, similar to FIG. 3, that shows a modified routine by which the microcomputer controls the display of navigational guidance.

Referring to FIG. 8, microcomputer 1 can also execute another timer interrupt routine. The steps of this timer interrupt routine that correspond to those of FIG. 3 are designated by identical reference numerals, and detailed explanation thereof will be omitted. If the program determines in Step 302 that an off-route deviation has not occurred, the program proceeds to Step 802 where flag F1 is cleared. By clearing flag F1, the result of Step 701, in the routine of FIG. 7 to be executed after this routine, will be negative. As a result the renewal of the restoration point is effected continuously. If the program determines in Step 302 that an off-route deviation has occurred, the program proceeds to Step 801 where flag F1 is set. By setting flag F1, the result of Step 701, in the routine of FIG. 7 to be executed thereafter, will be affirmative. As a result, the renewal of the restoration point after the off-route deviation is not effected.

In this embodiment, restoration point $a_0$ is computed before an off-route deviation occurs. Therefore the computation to determine the restoration point does not need to be effected after detecting an off-route deviation. (In the routine of FIG. 8, Step 305 of the routine of FIG. 3 is omitted.) The computation of restoration route $a_0$ can be effected more rapidly.

In the case where, before detecting an off-route deviation, the restoration point is located in a section between the present position of the vehicle and its destination, the restoration point may be located, not at the central point of this section, but nearer to the present position (for example, at a point spaced from the present position by a distance equal to 30% of the length of this section).

If the distance from the present position to the destination becomes shorter than the set distance, the optimal route from the present position to the destination may be computed when an off-route deviation occurs, as in the conventional method. Computation instruction switch 6 is no longer required, in which case the restoration route is automatically computed when an off-route deviation occurs.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A navigation system comprising:

means for detecting a present position of a vehicle;

first computing means for computing an optimal route for said vehicle from a starting point to a destination;

first means for selecting a first plurality of marked points on said optimal route;

said first plurality of marked points being used for determining a restoration point between said destination and a deviation point;

off-route detection means for detecting a deviation of said vehicle from said optimal route;

said deviation occurring at said deviation point;

second means for selecting one of said first plurality of marked points disposed between a point at which said deviation occurs and said destination, as a restoration point when said off-route detection means detects said deviation;

said second means for selecting including second computing means for computing an optimal restoration route from a plurality of restoration routes each extending from said present position to one of said first plurality of marked points disposed between a deviation point and said destination; and said optimal restoration route extending from said present position to said restoration point on said optimal route.

2. A navigation system according to claim 1, wherein said first means for selecting selects said first plurality of marked points from a set consisting essentially of intersections on said optimal route.

3. A navigation system according to claim 1, wherein said first means for selecting selects said first plurality of marked points from a set consisting essentially of predetermined intervals on said optimal route.

4. A navigation system according to claim 1, wherein:

said second selecting means selects as said restoration point a one of said first plurality of marked points that is nearest to said present position.

5. A navigation system, comprising:

means for detecting a present position of a vehicle;

first computing means for computing an optimal route for said vehicle from a starting point to a destination;

first means for selecting a first plurality of marked points on said optimal route;

said first plurality of marked points being used for determining a restoration point between said destination and a deviation point;

off-route detection means for detecting a deviation of said vehicle from said optimal route;

said deviation occurring at said deviation point;

second means for selecting said restoration point from said first plurality of marked points;

second computing means for computing an optimal restoration route from said present position to said restoration point on said optimal route when said off-route detection means detects said deviation;

said second selecting means further selects a second plurality of marked points from said first plurality of marked points, said second plurality of marked points being nearer in a straight distance to said present position than are other members of said first plurality of marked points; and said second computing means determines an optimal restoration route from a plurality of restoration routes each extending from said present position to each of said second plurality of marked points.

6. A navigation system, comprising:

means for detecting a present position of a vehicle;

first computing means for computing an optimal route for said vehicle from a starting point to a destination;

first means for selecting a first plurality of marked points on said optimal route;

said first plurality of marked points being used for determining a restoration point between said destination and a deviation point;

off-route detection means for detecting a deviation of said vehicle from said optimal route;

said deviation occurring at said deviation point;

second means for selecting said restoration point from said first plurality of marked points;

second computing means for computing an optimal restoration route from said present position to said restoration point on said optimal route when said off-route detection means detects said deviation;

said second selecting means further selects a second plurality of marked points from said first plurality of marked points, said second plurality of marked points comprising all marked points within a specified distance from a one of said first plurality of marked points that is nearest said present position; and said second computing means determines an optimal restoration route from a plurality of restoration routes each extending from said present position to each of said second plurality of marked points.

7. A navigation system, comprising:

means for detecting a present position of a vehicle;

first computing means for computing an optimal route for said vehicle from a starting point to a destination;

first means for selecting a first plurality of marked points on said optimal route;

said first plurality of marked points being used for determining a restoration point between said destination and a deviation point;

off-route detection means for detecting a deviation of said vehicle from said optimal route;

said deviation occurring at said deviation point;

second means for selecting said restoration point from said first plurality of marked points;

second computing means for computing an optimal restoration route from said present position to said restoration point on said optimal route when said off-route detection means detects said deviation;

said second selecting means further selects a second plurality of marked points from said first plurality of marked points, said second plurality of marked points comprising all marked points within a specified distance from said deviation point; and said second computing means determines an optimal restoration route from a plurality of restoration routes each extending from said present position to each of said second plurality of marked points.

8. A navigation system comprising:

a microcomputer;

a map information storage medium storing map information;

an axle sensor effective for determining distance traveled by a vehicle;

a directional sensor effective for determining direction of travel of said vehicle;

said microcomputer cooperating with said axle sensor and said directional sensor to determine a present position of said vehicle;

an input device effective for entering a starting point and a destination of said vehicle into said microcomputer;

said microcomputer cooperating with said map information storage medium for computing an optimal route for said vehicle from said starting point to said destination;

said microcomputer being effective for selecting a plurality of marked points on said optimal route;

said microcomputer cooperating with said map information storage medium, said axle sensor, and said directional sensor for detecting a deviation of said vehicle from said optimal route;

said microcomputer being further effective for selecting potential restoration points from ones of said plurality of marked points disposed between a point at which said deviation occurs and said destination;

said microcomputer being further effective for computing, when said deviation of said vehicle from said optimal route is detected, an optimal restoration route from a plurality of restoration routes each extending from said present position to one of said potential restoration points;

said optimal restoration route extending from said present position to a restoration point on said optimal route.

9. A navigation system according to claim 8, wherein said microcomputer selects said plurality of marked points respectively at successive intersections along said optimal route.

10. A navigation system according to claim 8, wherein said microcomputer selects said plurality of marked points at predetermined intervals on said optimal route.

11. A navigation system according to claim 8, wherein, when said deviation of said vehicle from said optimal route is detected, said microcomputer first selects as said restoration point a one of said marked points nearest to said present position and then determines said optimal restoration route from said present position to said restoration point.

* * * * *